(12) United States Patent
Chase et al.

(10) Patent No.: US 7,025,844 B2
(45) Date of Patent: Apr. 11, 2006

(54) VEHICLE WHEEL CONSTRUCTION PROCESS

(75) Inventors: Lee A. Chase, Grand Rapids, MI (US); Douglas Louis Neeb, Hastings, MI (US); Robert E. Shea, Newaygo, MI (US)

(73) Assignee: Lacks Industries, Inc., Grand Rapids, MI (US)

( * ) Notice: Subject to any disclaimer, the term of this patent is extended or adjusted under 35 U.S.C. 154(b) by 397 days.

(21) Appl. No.: 09/855,203

(22) Filed: May 14, 2001

(65) Prior Publication Data

US 2001/0020514 A1 Sep. 13, 2001

Related U.S. Application Data

(62) Division of application No. 09/184,190, filed on Nov. 2, 1998, now Pat. No. 6,346,159.

(51) Int. Cl.
*B29C 65/70* (2006.01)
*B32B 31/06* (2006.01)
*B32B 31/14* (2006.01)
*B60B 7/00* (2006.01)

(52) U.S. Cl. .............. 156/79; 264/46.5; 264/46.9; 425/117; 425/123; 301/37.43

(58) Field of Classification Search ............ 156/77–79; 264/46.5, 46.9; 425/123, 117; 301/37.43
See application file for complete search history.

(56) References Cited

U.S. PATENT DOCUMENTS

| | | | |
|---|---|---|---|
| 3,669,501 A | 6/1972 | Derleth | |
| 3,756,658 A | 9/1973 | Adams | |
| 3,762,677 A | 10/1973 | Adams | |
| 3,794,529 A | 2/1974 | Thompson | |
| 3,815,200 A | 6/1974 | Adams | |
| 3,823,982 A | 7/1974 | Spisak | |
| 3,891,276 A | 6/1975 | Spisak | |
| 3,918,762 A | 11/1975 | Hampshire | |
| 3,935,291 A | 1/1976 | Jackson | |
| 3,956,451 A | 5/1976 | Adams | |
| 3,968,996 A | 7/1976 | Wilcox | |
| 4,251,476 A | 2/1981 | Smith | |
| 4,300,803 A | 11/1981 | Chorosevic | |
| 4,398,770 A | 8/1983 | Smith | |
| 4,659,148 A | 4/1987 | Grill | |
| 4,682,820 A | 7/1987 | Stalter | |
| 4,786,027 A | 11/1988 | Stalter, Sr. | |
| 4,790,605 A | 12/1988 | Stalter, Sr. | |
| 4,861,538 A | 8/1989 | Stalter, Sr. | |
| 4,895,415 A | 1/1990 | Stay et al. | |
| 4,950,036 A | 8/1990 | Patti | |
| 5,098,272 A | 3/1992 | Joseph et al. | |
| 5,128,085 A | 7/1992 | Post et al. | |
| 5,143,426 A | 9/1992 | Todd | |
| 5,181,767 A | 1/1993 | Hudgins et al. | |
| 5,188,429 A | 2/1993 | Heck et al. | |

(Continued)

*Primary Examiner*—Adrienne C. Johnstone
(74) *Attorney, Agent, or Firm*—VanOphem & VanOphem, P.C.

(57) ABSTRACT

An improved process for permanently attaching an overlay to a wheel disc, wherein the overlay is aligned and spaced apart from the wheel disc. A mold is created by a combination of the overlay, wheel disc and localized nests that engage at predetermined times during foam filling to close the mold. The mold is adequately sealed so that there is no foam leakage as the foam expands to fill the mold and, therefore, no final trimming of excess foam is required. The improved process is capable of accommodating a wheel having turbine openings therein.

17 Claims, 7 Drawing Sheets

U.S. PATENT DOCUMENTS

| | | |
|---|---|---|
| 5,286,092 A | 2/1994 | Maxwell, Jr. |
| 5,360,261 A | 11/1994 | Archibald et al. |
| 5,368,370 A | 11/1994 | Beam |
| 5,372,406 A | 12/1994 | Ohtsuka et al. |
| 5,421,642 A | 6/1995 | Archibald |
| 5,435,631 A | 7/1995 | Maloney et al. |
| 5,597,213 A | 1/1997 | Chase |

VEHICLE WHEEL CONSTRUCTION PROCESS

CROSS-REFERENCES TO RELATED APPLICATIONS

This is a divisional application of U.S. patent application Ser. No. 09/184,190, filed on Nov. 2, 1998, now U.S. Pat. No. 6,346,159, issued Feb. 2, 2002.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates to composite wheel assemblies for vehicles having an overlay permanently attached to a wheel disc with a combination of adhesives and, particularly, to an improved apparatus and process for permanently attaching an ornamental overlay to the wheel using nests to locate and support the overlay to the wheel creating a mold into which foam can be injected.

2. Description of the Related Art

Decorative overlays are widely used to enhance the aesthetic appearance of automotive wheels. Overlays are not only employed to improve the appearance of unadorned standard steel wheels, but are also used with cast aluminum wheels, that are known to be expensive and difficult to plate with chromium. Numerous structural combinations of overlays with chrome-plated outboard surfaces have attracted great interest from vehicle manufacturers, because they are lightweight, aesthetically pleasing and offer designers complete flexibility with regard to the aesthetic effect that can be created for a specific vehicle regardless of whether these vehicles use steel or aluminum wheels.

In the past, most overlays were mechanically attached to the wheel. For example, Kapanka, U.S. Pat. No. 3,575,468, teaches the use of a spring retention device wherein a joined annular wire spring provides a plurality of outer cover-engaging segments adapted to be secured to a wheel cover at spaced peripheral portions. A plurality of axial segments interconnect the outer cover engaging segments with outer wheel-engaging segments adapted to engage a groove in the rim of the wheel. Stay et al., U.S. Pat. No. 4,895,415; Patti, U.S. Pat. No. 4,950,036; as well as Hudgins et al., U.S. Pat. No. 5,181,767, teach, alternatively, retention of the wheel cover by providing wheel cover retaining means for releasably coupling to at least one lug stud with appropriate configurations enabling releasable coupling between the retainer and at least one stud. German Patent 2,813,412 also mechanically attaches the overlay to the wheel by utilizing cavities or undercuts in the face of the wheel. Further, German Patent 2,848,790 also teaches mechanical attachment of the wheel cover to the wheel through the use of clamps so that the cover can be removed for the purpose of cleaning.

Others are adhered to the outboard surface of the wheel, as illustrated by U.S. Pat. No. 3,915,502 to Connell, that teaches an annular-shaped wheel cover that is permanently attached to the wheel with double-sided adhesive tape. The adhesive tape is positioned midway between the rim and the center hub area of the wheel, while the remainder of the wheel cover is spaced apart from the outboard surface of the wheel. Connell positions the adhesive tape at radially outward portions of the wheel in order to avoid the deleterious effects of heat generated by the tire, wheel and brake. While some pressure-sensitive adhesive tapes can be effectively used in temperatures up to 500° F. (260° C.), the cost of such adhesive tapes is generally prohibitive for use in mass production applications such as securing an overlay to a wheel. Consequently, such applications are generally limited to the use of less expensive adhesive tapes that have relatively low maximum operating temperatures, necessitating that their placement be restricted to the radially outward surfaces of the wheel. Unfortunately, doing so severely limits the adhesive tape's ability to reliably adhere the overlay to the wheel. Further, the use of adhesive tape because of its defined thickness creates a void between the overlay and the wheel that can collect dirt and debris that may affect the balance of the wheel.

To avoid such problems, as well as to avoid noise problems associated with the use of overlays, the prior art proposes the use of a urethane foam and a method of permanently attaching a plastic cover to a metal wheel through the use of a urethane foam adhesive, that effectively holds the cover in place, closes the void between the overlay and the wheel, and reduces noise as well as provides adequate theft deterrence. This method is best described in U.S. Pat. No. 3,669,501 to Derleth. The process disclosed in Derleth is an annular-shaped overlay composed of a thin plastic cover formed from acrylonitrile-butadiene-styrene (ABS) mounted to a wheel spider. The overlay is configured to have variations in contours in a direction transverse to the axis of the wheel that exceed the variations in the rim and/or disc contour of the wheel, which variations would be extremely difficult and expensive, if not impossible, to stamp or draw in the disc of the wheel. During assembly, a foamable polyurethane adhesive is coated on the wheel, and the cover is then quickly clamped to the wheel before the polyurethane begins to foam. As such, the void between the wheel and cover is filled with the polyurethane foam. However, any excess polyurethane foam formed around the bolt holes or at the periphery of the assembly surrounding the axle hub will squeeze out if appropriate sealing provisions are not made.

One obvious shortcoming of the process disclosed by Derleth is that the composite wheel must be imperforate, except for the small bolt openings necessary for attaching the wheel to a vehicle. It is understood by those skilled in the art that it is necessary to avoid the deleterious effects of heat generated by the wheel and brake, that cause the ABS plastic overlay to distort, cause delamination of any surface treatment, i.e. paint, plating, etc., and further cause the foam adhesive to degrade, distort and eventually melt. Further problems with urethane formed wheels surfaced in use. These wheels were very heavy due to the high density of the foam and variation in localized density during the manufacturing phase resulted in severe wheel imbalances.

Turbine openings are a necessary element in today's wheel systems in providing proper cooling to the brake system, not to mention the aesthetics of endless configurations of turbine openings that add individuality and style to a vehicle. Any opening in the wheel or overlay using the process disclosed in Derleth is a pathway for the foam mixture to escape when it begins to foam and/or cure. Larger openings, such as turbine openings, would not be possible using the Derleth process without additional structure to seal the openings to prevent the foaming material from escaping.

It is appreciated by those skilled in the art that it is advantageous to completely fill the cavity with foam adhesive to acoustically dampen any sound produced when the overlay is struck. A drawback of the process according to Derleth is that excess foam mixture is required to ensure that the cavity between the cover and the wheel is completely filled after the material vents out through the bolt openings. The process disclosed by Derleth requires any substantial opening in the wheel be plugged or sealed with a sleeve to prevent foam leakage. For example, if the wheel hub was left unsealed it would provide a path for some of the foam to escape, and the security of the cover could be jeopardized. Further, all of the excess foam must be manually removed, which adds significant cost to the process.

A further disadvantage of the process of Derleth is that the polyurethane foam adhesive completely breaks down at high temperatures, particularly in the immediate region of the wheel hub where temperatures tend to be much higher than in the remainder of the wheel.

The method according to Derleth has been known since the early 1970's and due to its many disadvantages has yet to realize practical applications and commercial success. The process cannot accommodate the application temperature requirements, the need for lighter weight components, and degradation of the urethane adhesive over time, as well as the need for turbine openings in the outboard face of the wheel. Further, the process is extremely costly due to the labor intensive trimming operations, difficult process control, environmental, health and safety concerns.

The teachings of Beam, U.S. Pat. Nos. 5,368,370 and 5,461,779, of a full surface curable adhesive are prohibitively expensive and wasteful since there is no need for a full surface uniform layer of adhesive to hold the overlay to the wheel. Further, a full surface uniform layer of curable adhesive also detrimentally affects the balancing considerations of the wheel and overlay assembly.

To avoid the problems of Beam, U.S. Pat. No. 5,597,213 to Chase, assigned to the assignee hereof, teaches the use of an intermediate positive fixing element for temporarily positioning and securing an overlay to a wheel during an interval in which a selectively positioned or applied adhesive required to permanently adhere the overlay to the wheel is allowed to cure. The adhesive is selectively placed between the overlay and the wheel to alleviate concerns of squeaks and rattles as well as to improve the overall manufacturability, performance and consumer-perceived quality of the resulting wheel assembly. The requirement of an intermediate positive fixing element not only adds costs to the overlay but requires careful handling and special packaging, all adding to the overall cost of the assembly.

Understandably, what is needed is an economical overlay apparatus and method for assembling such overlay to an automotive steel or alloy wheel, in which the method promotes the ability to accurately position and reliably permanently secure the overlay to the wheel by the use of selective application of a costly curable adhesive in combination with a less expensive foam adhesive so as to improve the manufacturability of the wheel, reduce the cost of manufacturing and not detrimentally affect wheel balance or performance.

SUMMARY OF THE INVENTION

The present invention provides a cost effective, highly efficient, safe process for permanently attaching an overlay or cladding to a wheel. The wheel has severe surface variations due to manufacturing tolerances. In addition, the overlay has its own surface variations due to manufacturing tolerances. When the overlay is attached to the wheel, these tolerances are stacked, and could result in an even larger variation. These stacked tolerance variances must be taken into consideration during the foaming process. If the variances are not properly accounted for, one of two things will happen. Either too much foam will be injected into the cavity and foam will flash out through any opening between the wheel and the overlay, as seen in the Derleth process, requiring trimming, or not enough foam will be injected into the cavity resulting in voids and inadequate cover retention. In the present invention, a sealant bead is generally applied along the outer periphery or diameter of the overlay. Optionally, a sealant bead may be applied around the turbine openings and/or inner diameter or periphery, to provide additional sealing and completely eliminate foam flashing, that in turn eliminates the step of trimming excess foam from any adjoining surfaces between the cladding and wheel after the adhesive/sealant has cured.

In the present invention, the overlay is aligned with, located, and clamped to the wheel with the exception of predetermined sealed areas. The outboard surfaces of the overlay and wheel are spaced apart, leaving a cavity therebetween. Localized nests at strategically placed locations act on the wheel and overlay assembly to seal the assembly on the wheel and thereby create a mold cavity. Net standoffs may be used to assist locating the cover with respect to the wheel and the localized nests interact with the overlay and wheel assembly to create a mold cavity between the overlay and the wheel into which the liquid foam is injected and allowed to react to fill the cavity.

A sealant or adhesive can be applied to the overlay prior to assembling the overlay to the wheel, depending on the type of wheel that is used to create the composite wheel assembly. If an adhesive/sealant is applied, the process begins by fixturing the overlay. In the present invention the overlay is oriented with the outboard face down in a nest or fixture. The overlay is located radially off the outside or inside diameter, circumferentially off the valve stem opening or turbine openings and axially off the outboard surface rim flange area. Vacuum may be applied to the cladding, if necessary, to remove any warpage and assure a truer inboard surface for adhesive or sealant application. Alternatively, the cladding may be fixtured and clamped to ensure the various locator datums are maintained. An adhesive/sealant is selectively applied to the cladding at preselected locations depending on the application. The sealant is applied to the surface of the overlay or the wheel before the cladding is joined to the wheel. Typically, the sealant will be applied to the outer diameter or peripheral edge of the overlay and, alternatively, as needed, the inner diameter or hub opening as well as surrounding the turbine openings. The adhesive/sealant can be applied to other areas for additional cladding adhesive strength/sealing or to direct the foam flow pattern. A robotic applicator system is used.

With the cladding appropriately fixtured, as disclosed above, the cladding is located on the wheel. It is preferable to locate axially off the tire side of the outer wheel flange or rim flange, radially off the tire side rim flange and circumferentially off the turbine openings or valve stem. The hub bore, bolt circle and other details can also be used depending on how the wheel is manufactured and the relationship of the datums to one another and to the overlay. The overlay is located in a fixture that locates and processes the cladding to the wheel. An optional clamping system is applied to the assembly following preheating of the assembly. The clamping system consists of temporary clamps, such as toggle clamps, to hold the overlay to the wheel until further processing steps are completed. Also, intermediate attachment and locating features can be used to hold the cladding to the wheel while the adhesive/sealant sets, if an adhesive is used.

At this point, if a sealant/adhesive is used, it may require additional curing. In such a case, the wheel and overlay assembly is transferred to a curing station, where the sealant/adhesive is allowed to cure. Depending on the type of adhesive/sealant used the curing may involve a chemical reaction in case of a two component adhesive, or heat or UV exposure to enhance the reaction and cure time of the adhesive/sealer before the clamping system is applied. Further conditioning of the assembly can also take place in the curing station.

After the adhesive/sealant has cured, or if no sealant is used, the wheel and overlay assembly is preheated. The preheating is necessary to raise the surface temperature of the assembly to a defined temperature that enhances foam initiation time, adhesion, gel, cohesion, filling, and resultant mechanical properties of the foam.

The preheated assembly is then placed in a filling station that consists of a clamping fixture having various nests and a foam metering unit. The wheel and cladding assembly enters the filling station with the wheel located outboard face down against the inboard side of the cladding and the pallet on which it travels is engaged by a lower moving platen that rises and clamps the wheel assembly and associated pallet between the lower and upper platen of the filling station fixture. A first set of nests, that may be made from a variety of materials depending on their function, engages predetermined areas of the cladding and wheel assembly from the bottom so as to conform to substantially the outboard surface of the cladding to support the cladding during the high pressure phase of the foam filling. A center bottom nest generally conforms to the inside diameter of the cladding and axle shaft opening of the wheel to provide a seal thereto. Optionally, a second set of nests independently seal the various turbine openings allowing independent movement to self-locate to the cladding and wheel. The various nests independently engageable, in combination with the steel wheel and cladding create a mold in which the foam can be injected. A metering unit is used to accurately mix and dispense the two component urethane foam. A nozzle mounted to the top clamp platen engages a fill port in the back side of the wheel to inject the foamable material in the cladding/wheel assembly cavity. The lower and upper platen clamp is held closed for a predetermined time while the foam flows, gels and thereafter fills the cavity. Thereafter the turbine openings, if used, center bottom and valve stem nests are disengaged and the lower and upper platen clamp is released to allow the pallet containing the cladding and wheel assembly to be moved to the next station for curing, and eventual removal from the fixture. A low out of round point is identified on the wheel assembly before it is shipped.

In summary, the wheel, overlay and selective application of the localized nests of the present invention create a sealed mold of the cavity between the wheel and the overlay for the foam to expand in to. The nests and the sealant bead, in combination with the clamping system, provide adequate sealing to prevent foam from escaping through any of the openings in the wheel disc. There is no need to add sleeves and covers, trim away excess foam from the wheel assembly, or clean up any foam scrap from the manufacturing equipment and area.

In another embodiment of the present invention, a vacuum can be applied to the cavity between the overlay and wheel during the foam filling process. Applying the vacuum has a dual purpose of providing additional holding force between the overlay and the wheel disc to prevent the pressure from separating the two elements, and assisting in filling the cavity, thereby eliminating voids.

It is an object of the present invention to provide an improved method of permanently attaching a chrome-plated overlay to any wheel disc with an adhesive. The improved process increases process control capabilities, improves product quality, and reduces environmental, health and safety concerns.

It is a further object of the present invention to use the improved process to permanently attach an overlay to a wheel having turbine openings, without the need for labor intensive trimming of excess foam, or the additional structure of sleeves and covers to seal the openings.

It is yet another object of the present invention to create a mold from the overlay, wheel, and localized nests that adequately seals any voids between the wheel and overlay and after the application of a sealer allows foam to be injected into the void, permanently attaching the overlay to the wheel, without the need to trim excess foam.

It is yet another object of the invention to provide an improved composite wheel chrome-plated overlay that utilizes a foamed adhesive in combination with a pre-disposed sealer to attach the chrome-plated overlay to any type of wheel and to seal all the interfaces between the overlay and the wheel so as to permanently attach the overlay to the wheel without the need of using excessive foam adhesive that must be cleaned from the composite wheel and overlay assembly prior to use on a vehicle.

It is yet a further object of the present invention to engage localized nests in predetermined timed sequence that seal the openings in the wheel and overlay assembly while allowing foam to completely fill the void between the wheel and overlay without escaping from the openings.

Further features and advantages of the present invention will be apparent from a reading of the detailed description thereof taken in conjunction with the accompanying drawings.

DETAILED DESCRIPTION OF THE PREFERRED EMBODIMENT

Figure 1:
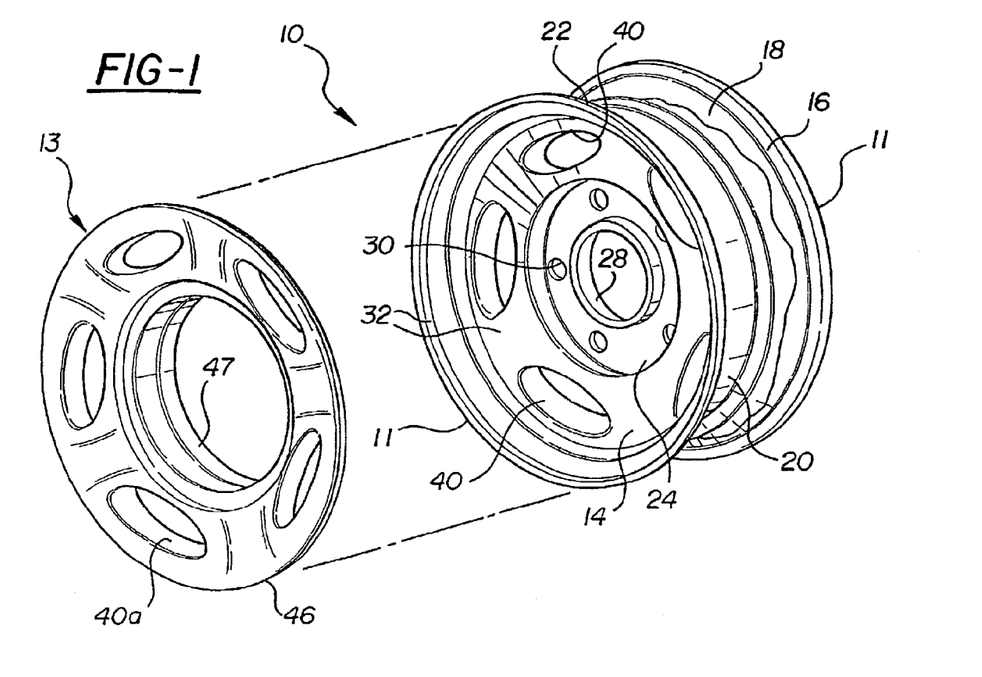
FIG. 1 is an exploded, perspective view of an improved composite vehicle wheel constructed according to the present invention.

Referring now to the drawings, there is illustrated in FIG. 1 an exploded, perspective view of an automobile wheel, indicated generally at 10, of a prior art drop well fabricated type of wheel 10, and includes an annular rim 11 and a wheel disc, spider or web 14 that together define an outboard surface of the wheel 10. An overlay 13 is attached to the wheel as will be described hereinafter.

Although this invention is discussed in conjunction with the particular wheel disclosed herein, it will be appreciated that the invention may be used in conjunction with other types of wheel constructions. For example, the wheel can be a "bead seat attached" wheel (such as shown in FIG. 4 of U.S. Pat. No. 5,188,429 to Heck et al.), a "full faced" wheel (such as shown in FIG. 2 of U.S. Pat. No. 5,595,423, to Heck et al.), a "bimetal" wheel construction including an aluminum disc and a steel rim (such as shown in U.S. Pat. No. 5,421,642 to Wei et al.), or a "modular wheel" construction including a "partial" rim and a full face wheel disc (such as shown in U.S. Pat. No. 5,360,261 to Archibald et al.), all of which patents and others are incorporated herein by reference.

The annular rim 11 is a fabricated rim constructed of steel, aluminum, or other suitable alloy materials. The annular rim 11 includes an inboard tire bead seat retaining flange 16, an inboard tire bead seat 18, a generally axially extending well 20, and an outboard tire bead seat 22. The annular rim 11 further includes an opening 19, shown in FIG. 2B, formed therein to accommodate a valve stem (not shown).

The wheel disc 14 is forged, cast, stamped, or otherwise formed, and is constructed of steel, aluminum, or other suitable alloy materials. The wheel disc 14 includes a generally centrally located wheel mounting surface 24, and an outer annular portion 26 shown in FIG. 2B. The wheel mounting surface 24 is provided with a centrally located pilot aperture 28, and a plurality of lug bolt receiving holes 30. The lug bolt receiving holes 30 receive lug bolts (not shown) for securing the wheel 10 on a vehicle axle (not shown).

Figures 2A, 2B:
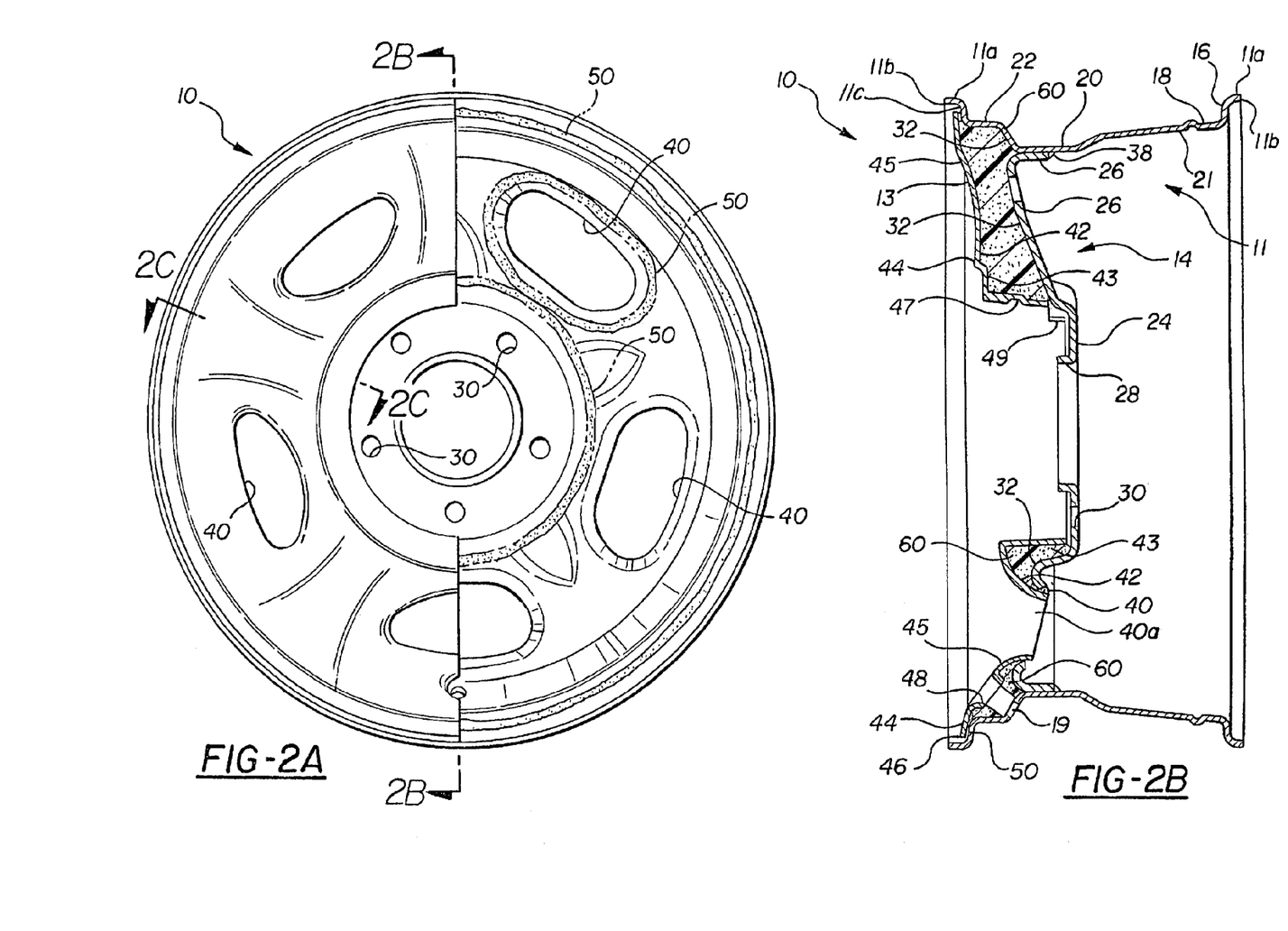
FIG. 2A is a side view, partially cutaway, of a vehicle wheel on which an overlay is adhered in accordance with an embodiment of the present invention.
FIG. 2B is a cross-sectional view taken along lines 2B—2B of FIG. 2A.

The outboard surface of the wheel disc 14 and the outer surface of the annular rim 11 define an outboard or outer surface 32 of the wheel 10, more clearly shown in FIG. 2B. To assemble the wheel 10, the outer annular portion 26 is positioned against an inner surface 21 of the rim 11, and a weld 38 is provided to join the wheel disc 14 and annular rim 11 together as shown in FIG. 2B. The wheel disc 14 further includes a plurality of turbine openings or decorative windows 40 (five windows being illustrated) that serve to stylize the wheel 10 or in some applications provide the function of cooling the brakes (not shown).

The wheel cover or overlay 13 in this preferred embodiment is a solid panel of a uniform thickness, preferably a high impact, high-temperature resistant chrome-plated plastic, secured directly to the outboard surface 32 of the wheel 10. The overlay 13, however, may be made from any type of material. The wheel includes a pair of rim flanges 11a (see FIG. 2B) spaced on opposing sides of the axially extending well 20 over which the standard tire is mounted. The rim flanges 11a circumscribe the wheel disc or web 14 that is welded to the annular rim 11, as is the case of a standard steel wheel, or integrally cast with the disc, as is the case of a cast aluminum wheel.

Figure 2C:
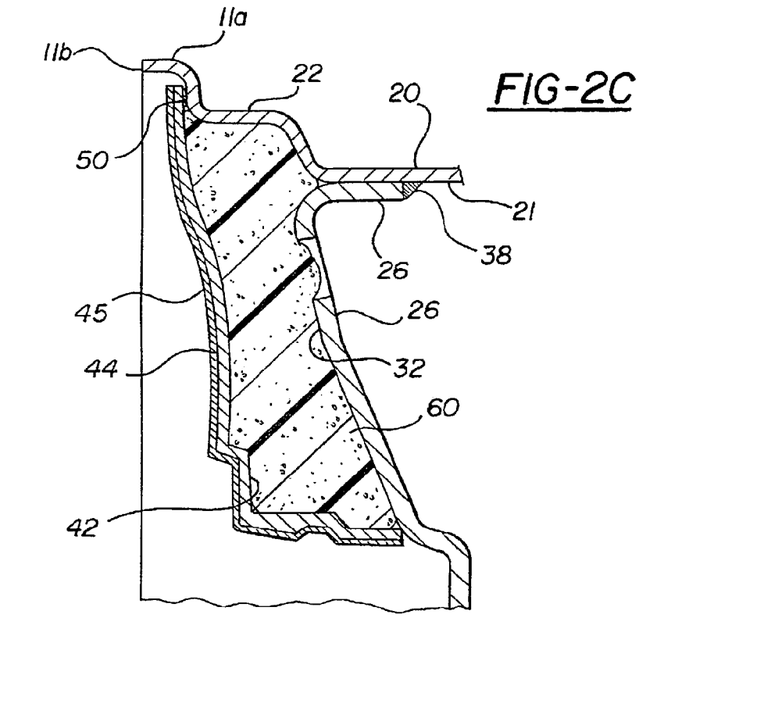
FIG. 2C is a partial cross-sectional view taken along lines 2C—2C of FIG. 2A.
Figure 2D:
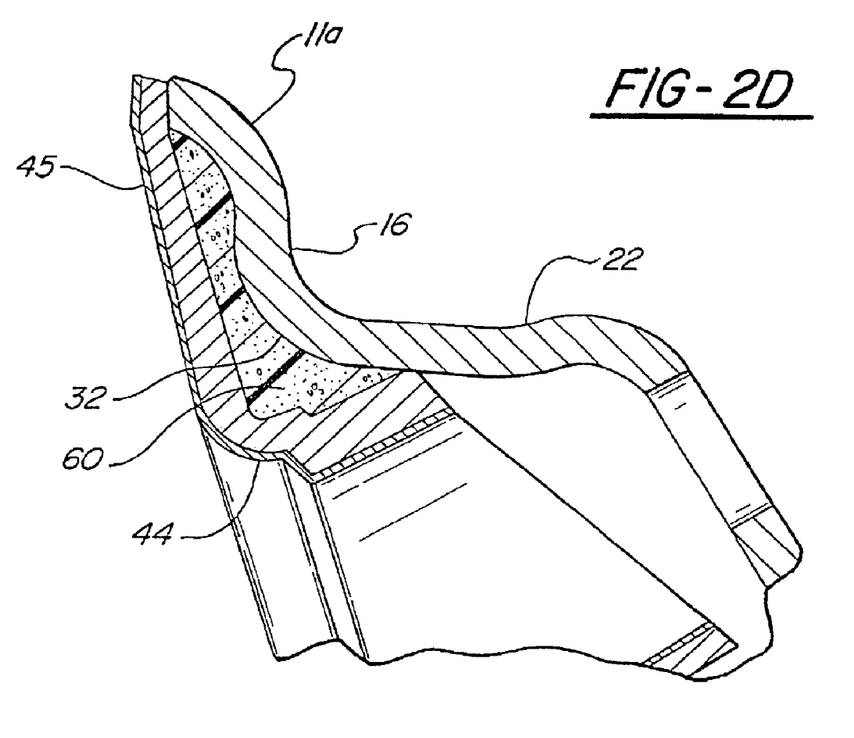
FIG. 2D is an alternative embodiment of the vehicle wheel depicted in FIG. 2C.

As shown in FIGS. 2B and 2C, an inboard surface 42 of the overlay 13 is configured to face the outboard surface 32 of the wheel 10 when assembled. An opposite or outboard surface 44 of the overlay 13 is therefore visible when the overlay 13 is assembled to the wheel 10. The outboard surface 44 of the overlay 13 is adapted to receive a decorative treatment layer 45. Preferably, a bright metal layer is electrochemically plated onto the outboard surface of the overlay 13 so as to contribute a bright appearance that adds an aesthetically pleasing appearance to the wheel 10. A painted surface is also contemplated for some applications. Furthermore, the overlay 13 is preferably formed from a high-impact plastic having an appropriate decorative treatment layer 45 on the outboard surface 44 thereof such that the overlay 13 and its metal plating are highly resistant to the adverse thermal environment of the wheel 10. Alternatively, other high impact and high temperature resistant plastic overlays or overlays made from any convenient material are contemplated. As a result, the metal-plated outboard surface of the overlay 13 can be allowed to redefine the contours of the outboard surface of the wheel 10, while resisting delamination of the metal plating due to heat or other environmental elements. As shown in FIG. 2B, the overlay 13 primarily covers that portion of the outboard surface of the wheel 10 formed by the wheel disc 14 inclusive of the rim flange 11c. However, in some applications the overlay does extend to cover the outer lip 11b of the annular rim 11, as shown in FIG. 2D.

As also shown in FIG. 2C, the wheel 10 further includes a high strength, permanent adhesive sealant 50 that is selectively deposited between the overlay 13 and the outboard surface 32 of the wheel 10 at the outer diameter of the overlay and optionally around the turbine openings 40 or inside diameter of the overlay (see FIG. 2B) so as to prevent the ingress of water and dirt between the overlay 13 and the wheel 10. Notably, significant portions of the interior of the outboard surface are not covered by the adhesive sealant 50, such that large voids 43 are present between the overlay 13 and the wheel 10 as a result of the overlay 13 being axially spaced apart from the outboard surface 32 of the wheel for a purpose hereinafter to be disclosed. The adhesive sealant 50 serves as a permanent and primary element for securing the overlay 13 to the wheel 10. High strength adhesives that are suitable for use as the adhesive sealant 50 of this invention are known and commercially available. Because of their high temperature capability and desirable mechanical properties, silicone and polyurethane adhesives are preferred. It is, however, foreseeable that other high strength and high temperature resistive adhesives could be employed with satisfactory results. While suitable adhesives for use as the adhesive sealant 50 must have excellent mechanical properties, such adhesives are generally characterized by relatively slow cure rates that can require several hours before the adhesive sealant 50 is sufficiently set to absorb severe impacts or harsh handling without detrimental effects thereto.

Accordingly, through experimentation with various adhesives it has been found that by managing the amounts of adhesive and its location it is contemplated to optimize the cure time. Further, it has been found that the use of a UV cure urethane adhesive/sealant significantly reduces cure time to a few minutes.

The wheel and overlay configuration illustrated in FIG. 2A is useful for illustrating some of the advantageous aspects of the present invention. A first aspect involves the use of one or more intermediate positive fixing elements for temporarily positioning and securing the overlay 13 to the wheel 10 during an interval in which the adhesive sealant 50 is allowed to cure as illustrated in U.S. Pat. No. 5,597,213, owned by the assignee hereof. A second and interrelated aspect of this invention involves the selective placement of the adhesive sealant 50 between the overlay 13 and the wheel 10 so as to improve the overall manufacturability, performance, and consumer-perceived quality of the resulting wheel assembly.

In view of the above, it can be seen that the embodiments illustrated in FIGS. 2A through 2D make combinations of overlays and wheels as well as novel methods for assembling the overlay to a wheel possible. In general, the method involves temporarily securing an overlay to the outboard surface 32 of a wheel and applying, in some areas, an adhesive sealant for the purpose of minimizing leakage of a foam adhesive that is injected between the cladding and wheel so that the overlay will remain positively positioned on the wheel until the adhesive sealant 50 cures completely. Accurate placement of an overlay on a wheel is necessary not only for aesthetic appearances, but also for proper wheel balance. The embodiments of FIGS. 2A and 2C require the use of equipment and/or fixtures for accurately locating the overlay on the wheel. Notably, the use of the snap tabs incorporated herein by reference as shown in FIG. 3 of U.S. Pat. No. 5,597,213 to Chase and owned by the common assignee hereof are particularly expedient, in that no additional feature is required on the wheel in order to accurately locate the overlay. In use, each of the elements illustrated in FIG. 3 of U.S. Pat. No. 5,597,213 cause the overlay to be spaced apart from the outboard surface of the wheel so as to define a gap that accommodates the curable adhesive sealant that permanently secures the overlay to the wheel.

The illustrated embodiments are not intended to be limiting. It is contemplated that other structural elements may be used to center the wheel as well as to accommodate tolerance variations that may result in unacceptable user-perceived aesthetic conditions.

ASSEMBLY PROCESS OF THE PREFERRED EMBODIMENT

Figure 3A:
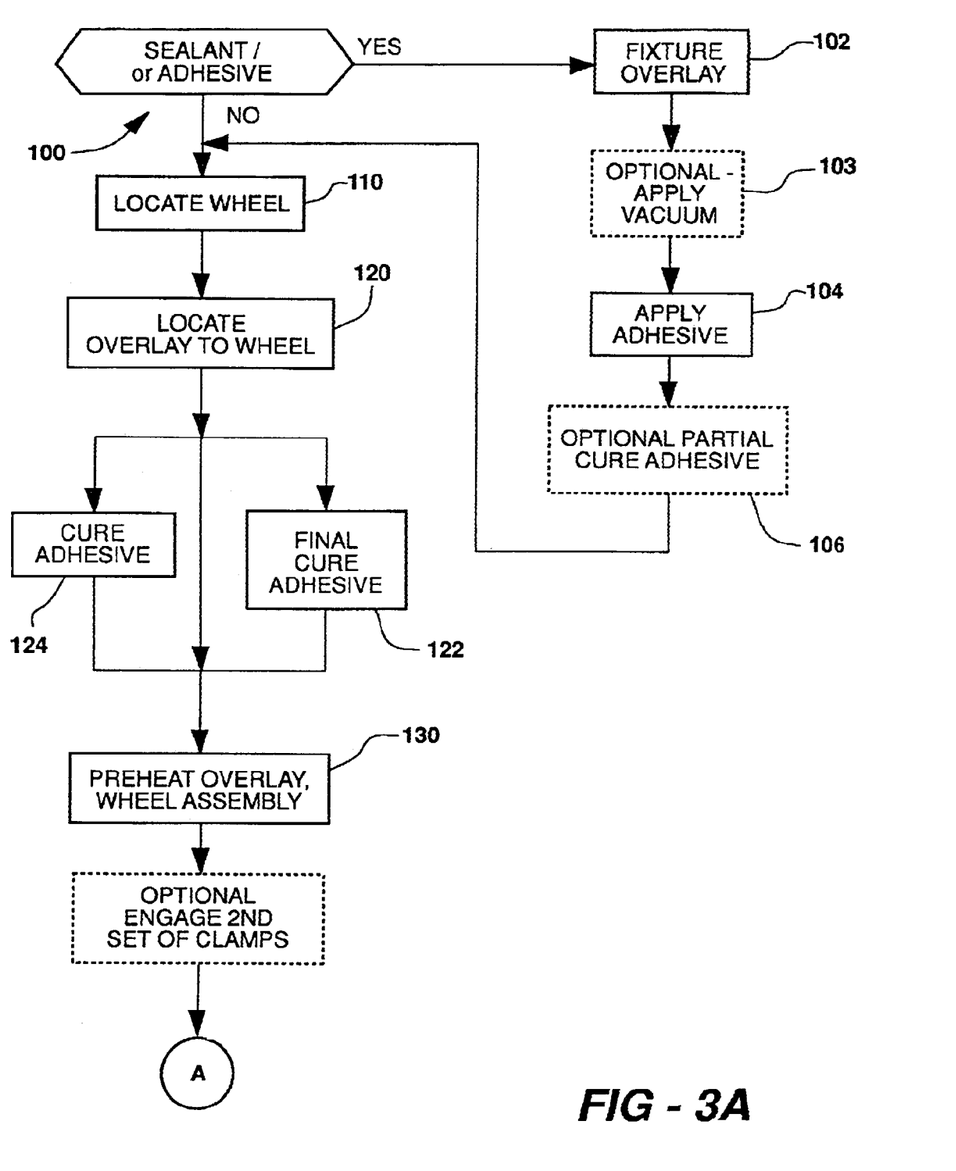
FIG. 3A is a flow chart depicting the beginning steps of the process of the present invention.
Figure 3B:
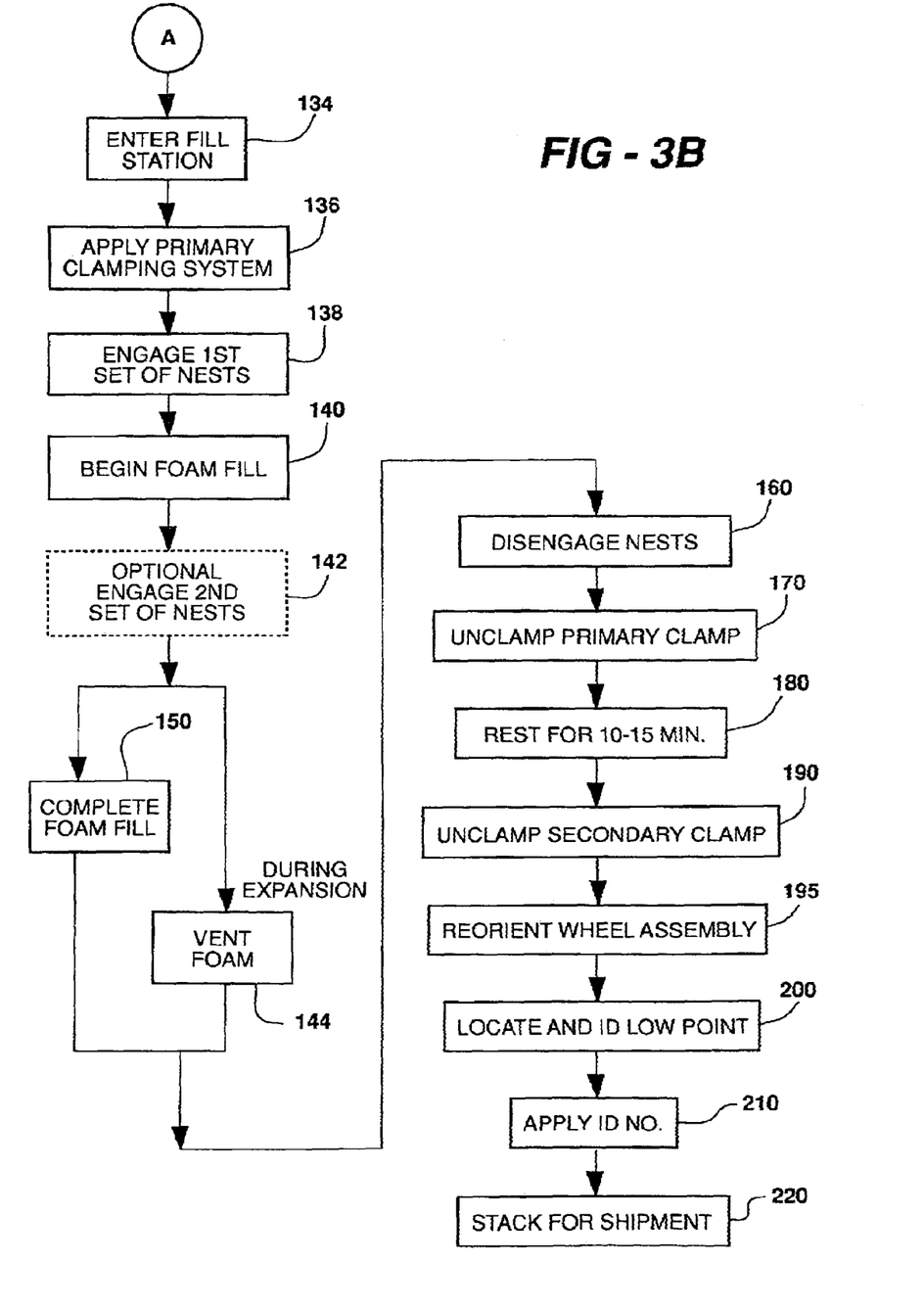
FIG. 3B is a continuation of the flow chart of FIG. 3A depicting the remaining steps of the process of the present invention.

Generally the process of assembly, 100, of the present invention, shown in flow chart form in FIG. 3A and FIG. 3B, involves fixturing an overlay, 102, applying an adhesive, 104, locating a wheel to the overlay, 110 and 120, thereby defining a cavity or voids 43 therebetween, preheating the overlay/wheel assembly 130, and filling the overlay/wheel assembly with a foam adhesive 140, 150. There are various optional steps and alternatives that will be discussed in detail throughout this assembly process.

Referring generally to FIGS. 2A through 3B, while the preferred process of assembly 100 teaches the use of an adhesive sealant 50 shown in FIG. 2C applied to the overlay 13 prior to locating the overlay 13 to the wheel 10 to serve the stated purposes, the process may be practiced without the use of the adhesive sealant 50 disclosed in the preferred embodiment or, alternatively, adhesive sealant 50 may be used on the respective mating surfaces of the wheel 10 and overlay 13 around the turbine openings. It is beneficial to apply the adhesive sealant 50 in areas of the wheel/overlay assembly 10, 13 that are known to squeak, and/or be difficult to seal due to manufacturing tolerances or known to be subject to entrapment of dirt, mud and/or water. For example, steel wheels sometimes have a rolled rim flange 11c as shown in FIG. 2B. It is difficult to assure a true surface at the rolled rim flange 11c, and it is generally known that foam 60, best shown in FIG. 2C, will leak in this area.

By applying the adhesive sealant 50 around the outer diameter of the wheel prior to filling the wheel/overlay assembly 10, 13 with foam 60, potential leaks are prevented. Further, to prevent squeaks, the sealant bead may be applied to the wheel 10 or overlay 13 and allowed to fully cure before the overlay 13 is applied to the wheel 10. This has been found to be an effective technique to more efficiently prevent squeaks. The rolled rim flange area 11c is frequently the first area to fail during durability testing. The additional holding force of the adhesive sealant 50 improves durability results. The adhesive sealant 50 is also used to create foam 60 flow patterns by directing the foam flow during the filling operation.

As stated, while the step of applying an adhesive sealant 50 to the overlay 13 prior to locating the overlay 13 to the wheel 10 in step 120 is not an essential one, it will be discussed as part of this detailed description of the preferred embodiment of the present invention.

The overlay 13 is initially oriented in a nest of a fixture with its outboard surface 44 facing downward. The overlay 13 is radially located off of either an outer diameter 46 or an inner diameter 47 of the overlay 13. The overlay 13 is circumferentially located off of either a valve stem opening 48, any turbine opening 40, or a hub opening 49. Finally, the overlay 13 is axially located at the rim flange area 11c of the outer diameter 46.

After locating and fixturing the overlay 13 in a nest, 102, alternatively, a vacuum may be applied, 103, to assure accurate location of the overlay in the nest. The vacuum, 103, is not necessary but will reduce warpage, assuring a true surface, i.e., as positioned against the wheel, to which the adhesive sealant 50 is applied, 104. The adhesive sealant 50 is preferably applied by a robot. Locating the overlay, 102, as if it was placed against a wheel surface is essential because it is important to apply the adhesive sealant, 104, in a uniform bead along a uniform path in order to avoid movement, i.e., droop of the adhesive sealant 50 in subsequent processing before curing, i.e., the overlay is moved with the fixture so as to be joined to the wheel as will be discussed hereinafter. The adhesive sealant 50 can be a silicone, urethane, epoxy acrylic or other suitable sealant or adhesive and, alternatively, may be allowed to partially cure, 106, before being joined to the wheel.

Locating the wheel, 110, in the fixture is the next step of the process 100. If an adhesive sealant 50 is not used, the first step of the process 100 is to mount the wheel onto the overlay in the fixture. Depending on the specific application, the wheel may be located axially off of the outboard or inboard surface of the rim flange 11c; radially off the inside diameter of the rim flange 11c and/or circumferentially off the valve stem opening 48 or fill hole or, alternatively, balance out, circumferentially, the plurality of turbine openings 40. The pilot aperture or hub bore 28, bolt pattern 30 and other details (not shown) can also be used as locating features depending on the type of wheel used and how the wheel 10 is manufactured and the relationship of these features to one another and to the overlay 13.

Figure 6:
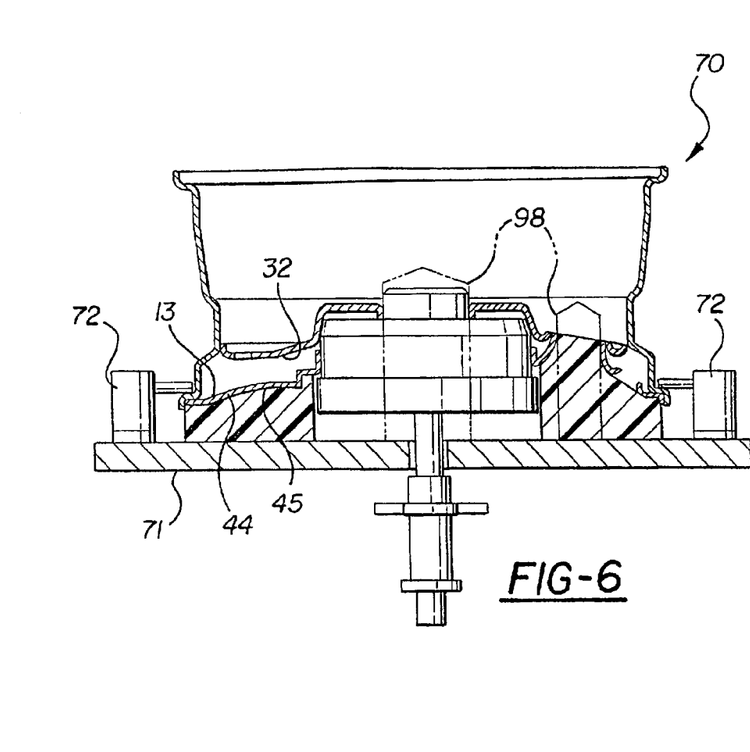
FIG. 6 is a partial cross-sectional view of the contour and lower nests as well as the secondary clamping system.

Referring now to FIG. 6, the overlay 13 is placed outboard side 44 down in a nest of a fixture 70 that locates the wheel 10 to the overlay 13. The wheel is indexed to the fixture 70, inverted and placed on the overlay. Intermediate attachments and location features can alternatively be used to temporarily clamp the overlay 13 to the wheel 10, for example by use of an independent or secondary clamping system 72, while the adhesive sealant 50 sets up. It is important to note that in the preferred embodiment, when the wheel is clamped to the overlay a thickness of adhesive sealant must remain between the overlay 13 and the wheel 10 at the rim flange 11c so that the wheel and overlay do not touch. This is preferred to avoid any noise, which could be generated as a result of relative movement between the overlay 13 and wheel 10 during the life cycle.

In high volume applications, the wheel/overlay assembly 10, 13 is placed on a palletized line. Individual pallets 71 on the palletized line move independently through a series of operations. The individual pallets 71 are equipped with the independent clamping systems or secondary-clamping systems 72 that hold the wheel 10 in place on the overlay 13.

Returning to FIGS. 3A and 3B, if an adhesive sealant 50 has been used or has been partially cured, the wheel/overlay assembly 10, 13 moves to a final curing station, 122. If no partial cure has occurred and an adhesive sealant was used, the wheel/overlay assembly 10, 13 moves to a final curing station 124. If no adhesive sealant was used the wheel/overlay assembly 10, 13 goes directly to the preheat station 130. Thereafter, it may undergo heat, humidity or other conditioning. The conditioning required will be dependent upon the type of adhesive sealant 50 material used. This step is not necessary if an adhesive sealant 50 is not used.

The wheel/overlay assembly 10, 13 is then preheated, 130. It may be possible to perform this step simultaneously with the curing step when an adhesive sealant 50 is used. It is desirable for all the surfaces of the wheel/overlay assembly 10, 13 to reach a predetermined temperature of approximately 170° F., depending on the type of adhesive sealant used. Surface temperature affects the foam 60 in a variety of ways, including adhesion, gel, foam initiation time, cohesion, foam filling characteristics, and resultant mechanical properties. The preheat temperature is within the range of 90° F. to 190° F. The preferred range is 120° F. to 140° F.

After preheating, 130, the wheel/overlay assembly 10, 13 is transferred to a check station (not shown) where infrared sensors check the temperature in several pre-determined places. The wheel/overlay assembly is re-routed to the preheating station if the sensors indicate that the assembly is not at proper preheat temperature. If the proper preheat temperature is sensed, optionally the wheel/overlay assembly may be clamped while the pallet containing the wheel/overlay assembly is routed to the filling station 80 shown schematically in FIG. 5. The filling station 80 shown in FIG. 4 and FIG. 5 consists of a lower moving platen 82 and an upper platen 84, which constitute the primary clamping system, a foam metering unit 90, and a nest system 95, that will be described in detail below. The filling station 80 is tilted from horizontal to assist liquid foam flow and proper filling of the voids 43.

The wheel/overlay assembly 10, 13 on a palletized system will undergo the following sequence at the filling station 80, as shown in FIG. 3B. The wheel/overlay assembly 10, 13 and pallet 71 enter the filling station, 134; the secondary clamping system 72 has already been engaged; the pallet 71 is located and engaged by the lower moving platen 82; and the lower moving platen 82 rises with the pallet containing the wheel/overlay assembly to engage the upper platen 84 and clamp the assembly securely, 136, in the filling station fixture of the primary clamping system with the wheel/overlay assembly 10, 13 and the pallet 71 secured between the lower moving platen 82 and the upper platen 84. A first set of nests 96 of the nest system 95 are engaged, 138, as the pallet 71 is clamped between the lower moving platen 82 and upper platen 84 (described in detail below); and a foam injector nozzle 62 seals the fill port and begins to inject the foam, 140, as a result of the fixture being tilted from horizontal, the foam flows to the lowest area of the voids 43 and begins to fill the void from the lowest point towards the highest area of the voids 43. At about 4 seconds, the foam 60 begins to gel. In about 4 seconds the foam 60 liquid starts to foam. The foam 60 begins to expand and fill the voids from the lowest point of the wheel/overlay assembly 10, 13 towards the highest point of the wheel/overlay assembly 10, 13, pushing air out of the voids 43 of the wheel/overlay assembly 10, 13. As the foam flow approaches the upper openings, i.e., turbine openings 40, and center hub opening 49, optionally a second set of nests 97 (also to be described in detail below) of the nest system 95 may engage the wheel/overlay assembly 10, 13, 142, and sequentially seal each of the turbine openings 40 as the foam rises. The second set of nests 97 may optionally be vented so that after the last turbine opening is sealed, the foam completely seals the voids or cavities 43 by venting the air through the vent, 144, in the second set of nests 97. If the cavity 43 is vented through the nesting system 95, it is possible that all nests are applied at the same time so that the air in the cavity is allowed to vent while the foam fills the cavity 43.

Pressure builds within the cavity 43 between the overlay 13 and the wheel 10 to about 20 psi. The primary clamping system is held closed for about two minutes (note: if the secondary clamping system 72 discussed above is not used, the primary clamping system must remain closed for 8–10 minutes). Thereafter the first set of nests 96 and second set of nests 97 are disengaged, 160, (the nest system can be periodically sprayed with a mold release agent to aid in disengaging the nest system 95 from the wheel/overlay assembly 10, 13) and the primary clamping system opens, 170. The pallet 71 is thereafter unloaded from the fill station and placed on the production line and moved to the next station.

The newly foamed wheel/overlay assembly 10, 13 rests for 10 to 15 minutes, 180, under light clamping pressure of the secondary clamping system 72 as the foam 60 continues to expand slightly. The wheel/overlay assembly 10, 13 is thereafter unclamped, 190, from the pallet 71 and indexed to a station where the pallet is flipped over so that the wheel/overlay assembly 10, 13 is oriented to have the outboard side of the wheel facing upward, 195. The wheel/overlay assembly 10, 13 is then placed back on the pallet and directed to a station that locates the low point of the wheel/overlay assembly 10, 13, where a sticker is applied to identify the low point, 200, for subsequent handling. A serial identification number is applied, 210, to the wheel/overlay assembly 10, 13, and the wheel/overlay assembly 10, 13 is then inspected and stacked for shipment, 220.

Figure 4:
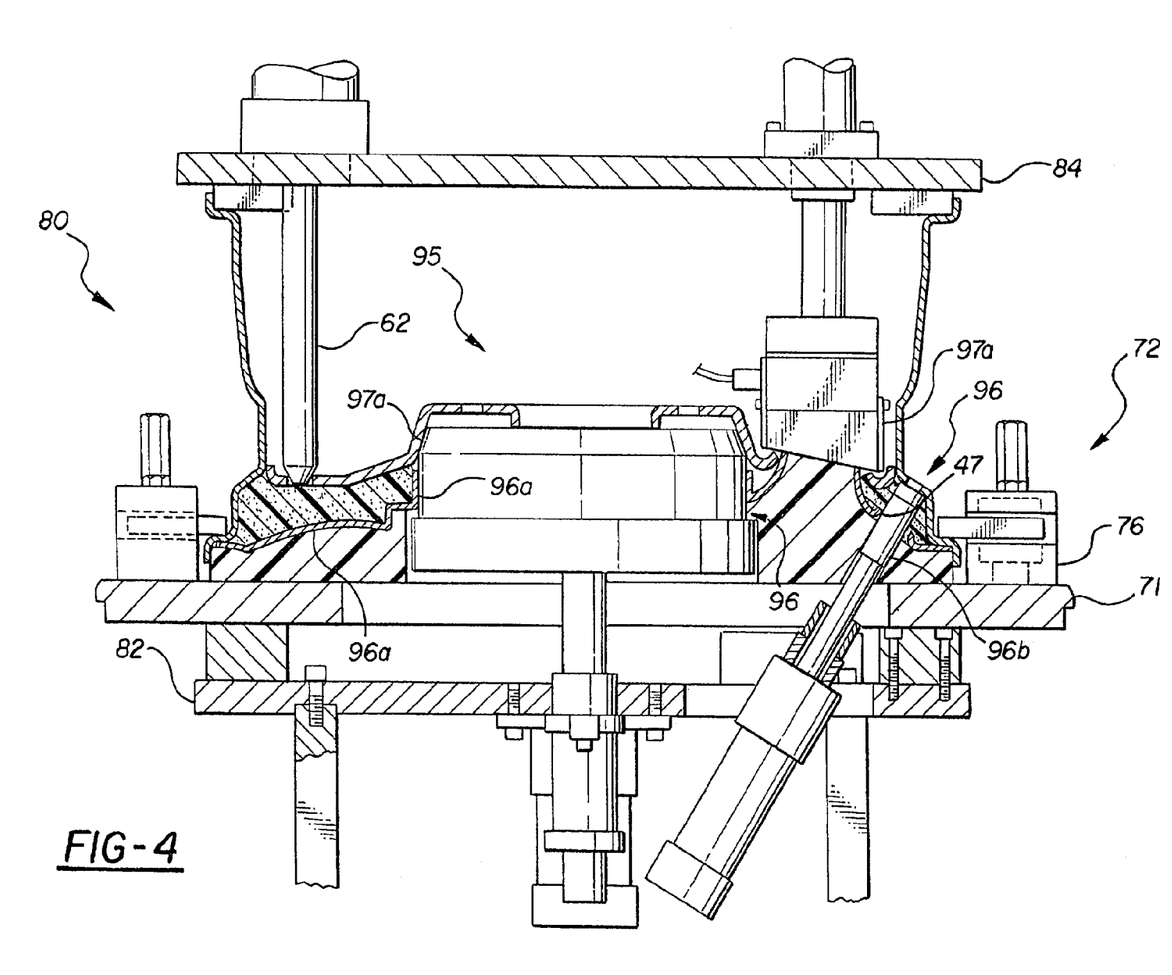
FIG. 4 is a partial cross-sectional view of the fixturing of the overlay and wheel assembly in the filling station of the process of the invention.
Figure 5:
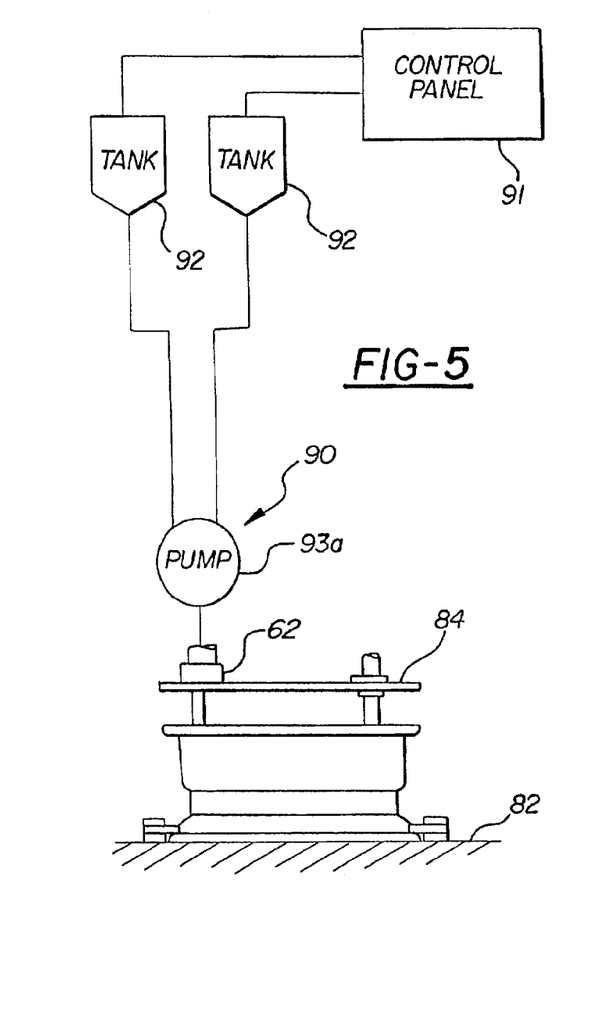
FIG. 5 is a schematic representation of the foam filling station of the present invention.

As stated above, the clamping system of the present invention is described in detail herein with reference to FIGS. 4 and 5. The primary clamping system of the preferred embodiment consists of the upper stationary platen 84 and the lower moving platen 82 of the filling station 80. The primary clamping system provides the necessary holding force during the foam filling steps 140, 150 by moving the lower moving platen 82 towards the upper stationary platen 84 and applying pressure for a predetermined amount of time. The foam is injected into the cavity 43 while the lower moving platen 82 presses the wheel/overlay assembly 10, 13 into the upper stationary platen 84.

As discussed earlier, the secondary clamping system 72 can also be used on the pallets 71, to hold the overlay 13 to the wheel 10 while the adhesive sealant 50 cures. The secondary clamping system 72 is also used to maintain the necessary clamping force during the lower pressure curing stages of the foam process. The secondary clamping system 72 can be as simple as a plurality of mechanical toggle clamps 76, shown in FIG. 4, that sandwich the wheel 10 and overlay 13 to the pallet 71 and the first set of nests or bottom nests 96. This reduces the time that the filling station 80 is utilized. The secondary clamping system 72 reduces the clamp time in the filling station 80 from 10 minutes to about 2 minutes. Because the filling station 80 is an extremely high capital investment, the secondary clamp system 72 is economical and results in higher production rates.

As stated above, the nest system 95 will be discussed in detail herein with reference to FIG. 4. The nest system 95 has a variety of nests that serve specific purposes. The nests are made out of a variety of materials depending on their specific purposes. The nests are located on the top and bottom portion of the platens. Some of the nests can be integral to the pallet in a palletized line.

The first set of nests 96 includes bottom nests 96a and a valve stem opening nest 96b. The bottom nests 96a generally conform to the outboard surface 44 of the overlay 13, and seal the hub opening 49 and lug nut openings and their purpose is to support the overlay 13 during the high pressure phase of the foam filling of 140, 150. The bottom nests 96a prevent the overlay 13 from lifting off the wheel 10 when the foam 60 expands. The bottom nests 96a are capable of spanning a significant portion of the overlay 13 without distortion. The bottom nests 96a can be manufactured using pour-in-place techniques with high durometer silicone, epoxy or urethane, or the bottom nests 96a can be cast or milled out of aluminum or steel. The valve stem opening nest 96b independently engages, allowing independent movement for locating the overlay 13 to the wheel 10.

Generally, turbine openings 40a of the overlay 13 extend slightly through an inside periphery of the turbine openings 40 in the wheel as shown in FIG. 2B. This creates a gap between the turbine openings 40 of the wheel 10 and the turbine openings 40a of the overlay 13. The alignment between the overlay 13 and the wheel 10 varies in all directions due to individual part manufacturing tolerances and assembly tolerances. The upper nests, including the turbine opening nests 97a, accommodate these variations because the turbine opening nests 97a are made of a soft resilient material such as silicone or urethane that is capable of being displaced.

The turbine opening nests 97a are made out of a softer durometer material, such as silicone or urethane, to seal the gap between the turbine openings 40a in the overlay 13 and the wheel 10. The gap varies due to offset tolerances between the wheel disc 14 and the annular rim 11. The center bottom nest 96a must also accommodate these variations. Thus, a softer nest material, that can be compressed in an axial direction against the wheel 10 and expand radially creating a seal between the overlay 13 and the wheel 10, is used. Not all wheel designs will require a nest in this area because the seal may, alternatively, be accomplished by applying a bead of adhesive sealant 50 between the overlay 13 and the wheel 10 about the inner diameter 47 or turbine openings.

If optional nests are used, these nests are also used to aid venting by engaging in a predetermined sequence at a predetermined time combined with the turbine opening nests 97a after the first set of lower nests 96 engage. Venting is necessary to ensure uniform foam flow and adequate foam quantity as the platens 82, 84 are closed. The first set of nests 96 initially seal all of the gaps between the overlay 13 and the wheel 10 except for the inner diameter 47. As the liquid foam 60 is injected into the cavity 43 between the overlay 13 and the wheel 10, it circulates around the void or cavity 43 towards the outer diameter 46, begins to gels, and starts to foam in a direction from the lowest point of the void 43 at the outer diameter 46 towards the inner diameter 47. As the foam 60 advances toward the inner diameter 47, the air in the cavity is forced out of the aperture of the inner diameter 47 and the pilot aperture 28 as well as the turbine openings of the wheel. If the optional turbine opening nests are used, as the foam 60 nears each of the turbine openings each opening is sealed individually until the foam approaches the inner diameter 47. The pilot aperture 28 and lug bolt receiving holes 30 are thereafter sealed with the bottom nests 96a that are timed to engage and seal this final area to be filled, 144. This same venting technique can be used with other nests to meet various design conditions. Alternatively, the vents may be contained within the individual nests so that the cavity can properly vent even if all of the nests are applied at once to define the cavity.

The nest system 95 in combination with the overlay 13 and the wheel 10 create a mold in which the foam 60 can be injected and allowed to expand within the cavity or void 43.

In another embodiment of the present invention, best shown in FIG. 6, the bottom nests 96a can be configured to positively locate in the pilot aperture 28 of the wheel hub or the lug bolt receiving holes 30. This can be done by using tapered hardened steel pins 98 in the pilot aperture 28 of the hub or a series of steel pins 98 are placed in the lug bolt receiving holes 30.

The foam metering unit 90 shown in FIG. 5 is employed to accurately dispense the foam 60. Generally, the foam 60 consists of two components. The foam metering unit 90 includes a control panel 91, polyol and isocyanate mix tanks 92, hydraulic pump 93a, material feed lines, and the high pressure dispensing head and foam injector nozzle 62 (shown in FIG. 4). The metering unit 90 can accommodate multiple filling stations 80 as shown in FIG. 4.

In one variant of the present invention, the high pressure dispensing head/foam injector nozzle 62 is mounted on the upper stationary platen 84. The foam injector nozzle 62 engages a fill port aligned with the foam injector nozzle 62 in the wheel 10. Liquid foam is injected through the fill port into the wheel/overlay assembly 10, 13 and cavity 43 as earlier set forth.

The present invention provides an improved method of permanently attaching an overlay to a wheel disc with an adhesive foam by creating a mold of the cavity between the wheel and the overlay using localized nests. The present invention can be used with an overlay and wheel having at least one turbine opening, without the need for labor intensive trimming of excess foam, or the additional structure of sleeves and covers to seal the openings. It is to be understood that the detailed description and drawings of the present invention do not describe the only embodiment of the present invention and, in fact, various modifications are obtainable without departing from the scope of the present invention, and should be taken in conjunction with the appended claims.

What is claimed is:

1. A process for permanently attaching an overlay having an outboard surface, an inboard surface, an outer diameter, an inner diameter, a valve stem opening, at least one turbine opening, and a flange area to a wheel having an outboard surface, an outer diameter with a wheel rim flange, a valve stem opening, at least one turbine opening, a hub bore, and a bolt pattern, said process comprising the steps of:

locating said overlay in a fixture with its inboard surface exposed and its outboard surface facing downward;

applying a sealant to a predetermined area of said inboard surface of said overlay;

locating said wheel;

placing said wheel in said fixture with said outboard surface facing said inboard surface of said overlay to define an overlay/wheel assembly having a cavity therebetween;

conditioning said overlay/wheel assembly to completely cure said sealant;

heating said overlay/wheel assembly to a predefined temperature within the range of 90° F. to 190° F.;

clamping said overlay/wheel assembly to a pallet and placing said pallet at an angle with the horizontal in a filling station;

engaging a first set of nests with said overlay/wheel assembly, said first set of nests comprising a bottom nest, a valve stem nest, and at least one turbine opening nest, said bottom nest generally conforming to said outboard surface of said overlay;

injecting liquid foam into said cavity;

selectively engaging a second set of nests with said overlay/wheel assembly, said second set of nests comprising at least one turbine opening nest and a center bottom nest generally conforming to said inner diameter of said overlay and said bolt pattern of said wheel wherein said center nest bottom creates a seal by means of expanding radially when compressed in an axial direction against said wheel;

whereby said second set of nests are selectively engaged as said liquid foam expands within said cavity to fill said cavity such that after all of said nests are engaged said foam completely fills said cavity;

disengaging said second set of nests from said overlay/wheel assembly after a predetermined time;

disengaging said first set of nests from said overlay/wheel assembly; and maintaining light clamping pressure on said overlay/wheel assembly until said foam completely cures.

2. The process as claimed in claim 1 further comprising the step of applying a vacuum to said overlay before said step of applying a sealant to said overlay.

3. The process as claimed in claim 1 wherein said step of locating said overlay further comprises:

radially locating said outer diameter of said overlay;

circumferentially locating said overlay off of said valve stem opening of said overlay; and axially locating said overlay off of said wheel rim flange of said outer diameter of said overlay.

4. The process as claimed in claim 3 wherein said step of radially locating said overlay further comprises locating said overlay off of said inner diameter of said overlay.

5. The process as claimed in claim 3 wherein said step of circumferentially locating said overlay further comprises locating said overlay off of said at least one turbine opening of said overlay.

6. The process as claimed in claim 1 wherein said step of applying said sealant further comprises robotically applying said sealant.

7. The process as claimed in claim 1 wherein said step of applying said sealant further comprises applying a sealant from the group consisting of silicone, urethane, epoxy, and acrylic.

8. The process as claimed in claim 1 wherein said step of locating said wheel further comprises:

axially locating said wheel off of said wheel rim flange;

radially locating said wheel off of said wheel rim flange; and circumferentially locating said wheel off of said valve stem opening.

9. The process as claimed in claim 8 wherein said step of circumferentially locating said wheel further comprises locating said wheel off of said at least one turbine opening.

10. The process as claimed in claim 1 further comprising the step of placing said overlay/wheel assembly on a palletized line such that said pallet can be moved independently through a series of operations before said step of preheating said overlay/wheel assembly.

11. The process as claimed in claim 10 wherein said step of placing said overlay/wheel assembly on said palletized line further comprises placing said overlay/wheel assembly on an individual pallet having independent clamping means to hold said overlay on said wheel so as to maintain light clamping pressure until said liquid foam cures.

12. The process as claimed in claim 11 wherein said step of placing said overlay/wheel assembly on said individual pallet having independent clamping means further comprises placing said overlay/wheel assembly on said individual pallet having independent clamping means comprised of a plurality of mechanical toggles that sandwich said overlay/wheel assembly to said individual pallet and said bottom nest.

13. The process as claimed in claim 1 wherein said step of engaging said first set of nests further comprises engaging a bottom nest manufactured by pour-in-place techniques of a material chosen from the group consisting of high durometer silicone, epoxy, and urethane.

14. The process as claimed in claim 1 wherein said step of engaging said first set of nests further comprises engaging said bottom nest manufactured by casting a material chosen from the group consisting of aluminum, steel, and kirksite.

15. The process as claimed in claim 1 wherein said step of engaging said first set of nests further comprises engaging said bottom nest manufactured by milling a material chosen from the group consisting of aluminum and steel.

16. The process as claimed in claim 1 wherein said step of engaging said first set of nests further comprises engaging said valve stem nest and said at least one turbine opening nest independently, allowing independent movement for locating said overlay to said wheel.

17. The process as claimed in claim 1 wherein said step of clamping said overlay/wheel assembly to a pallet further comprises:

clamping said overlay/wheel assembly to said pallet by a clamping system having an upper stationary platen and a lower moving platen below said upper stationary platen; and raising said lower moving platen towards said upper stationary platen whereby said overlay/wheel assembly is held between said upper and lower platens.

* * * * *

UNITED STATES PATENT AND TRADEMARK OFFICE
CERTIFICATE OF CORRECTION

| | |
|---|---|
| PATENT NO. | : 7,025,844 B2 |
| APPLICATION NO. | : 09/855203 |
| DATED | : April 11, 2006 |
| INVENTOR(S) | : Chase et al. |

It is certified that error appears in the above-identified patent and that said Letters Patent is hereby corrected as shown below:

Column 5, Line 44, after "cladding" kindly insert --,--.

Column 10, Line 24, kindly delete "40" and insert --40a--.

Column 10, Line 51, kindly delete "48" and insert --19--.

Signed and Sealed this

Twenty-fifth Day of December, 2007

JON W. DUDAS
*Director of the United States Patent and Trademark Office*